United States Patent
Engel

(10) Patent No.: US 6,175,780 B1
(45) Date of Patent: Jan. 16, 2001

(54) ACCESSORY NETWORK FOR AN ELECTRONIC TRIP UNIT

(75) Inventor: Joseph Charles Engel, Monroeville, PA (US)

(73) Assignee: Eaton Corporation, Cleveland, OH (US)

(*) Notice: Under 35 U.S.C. 154(b), the term of this patent shall be extended for 0 days.

(21) Appl. No.: 09/055,559

(22) Filed: Apr. 6, 1998

(51) Int. Cl.7 .................................................. G05D 3/20
(52) U.S. Cl. .......................... 700/293; 700/292; 700/3; 702/64
(58) Field of Search .................................... 700/292, 293, 700/3, 4; 702/62, 58, 64; 361/66, 62, 63

(56) References Cited

U.S. PATENT DOCUMENTS

| | | | |
|---|---|---|---|
| 4,428,022 | 1/1984 | Engel et al. | 361/96 |
| 4,484,258 | * 11/1984 | Miller et al. | 700/12 |
| 4,996,646 | 2/1991 | Farrington | 364/483 |
| 5,203,497 | * 4/1993 | Ratz et al. | 236/46 R |
| 5,280,477 | * 1/1994 | Trapp | 370/356 |
| 5,420,799 | 5/1995 | Peterson et al. | 364/483 |
| 5,428,553 | * 6/1995 | Chiba et al. | 700/293 |
| 5,500,781 | 3/1996 | Santos | 361/96 |
| 5,524,083 | 6/1996 | Horne et al. | 364/492 |
| 5,525,985 | 6/1996 | Schlotterer et al. | 341/136 |
| 5,596,473 | * 1/1997 | Johnson et al. | 361/97 |
| 5,600,527 | * 2/1997 | Engel et al. | 361/93.2 |
| 5,835,370 | * 11/1998 | Nakamura | 700/3 |
| 5,940,257 | * 8/1999 | Zavis | 361/42 |
| 5,974,545 | * 10/1999 | Obermeier et al. | 713/1 |

* cited by examiner

Primary Examiner—Paul P. Gordon
Assistant Examiner—Paul Rodriguez
(74) Attorney, Agent, or Firm—Martin J. Moran

(57) ABSTRACT

An electronic trip unit having a two-wire, asynchronous, serial communication accessory network that is connected to a number of unique digital and analog remote slave devices. The address for each slave device is set by its function so that the trip unit does not have to be programmed in the field each time an accessory is added to the system. The network is capable of two-way communication when requested by the electronic trip unit. Accessory network communication is controlled by a first microprocessor within the electronic trip unit or alternatively by a network interface gateway. The first microprocessor controls voltage based and metering functions while a second microprocessor controls overcurrent and instantaneous protection functions of the trip unit. The second microprocessor also has the capability of communicating with a central control network.

8 Claims, 5 Drawing Sheets

ACCESSORY NETWORK FOR AN ELECTRONIC TRIP UNIT

CROSS REFERENCES TO RELATED APPLICATION

This application is related to patent application Ser. No. 09/055,522 filed concurrently herewith.

FIELD OF THE INVENTION

This invention relates in general to electrical switching apparatus, and more particularly to such apparatus that electrically communicate with a plurality of unique accessory devices.

BACKGROUND INFORMATION

Circuit breakers are widely used in industrial, commercial and residential applications for protecting electrical conductors and apparatus from damage due to excessive current flow. Initially used as a direct replacement for fuses, circuit breakers have been gradually called upon to provide more sophisticated types of protection other than merely interrupting the circuit when the current flow exceeds a certain level. More elaborate time-current trip characteristics have been developed such that a circuit breaker can rapidly open upon very high current with the time delay being roughly inversely proportional to the degree of overload. Circuit breakers are also available which interrupt upon the detection of ground fault currents. As the complexity of electrical distribution circuits has increased, the control portions of the circuit breaker have been interconnected to provide selected coordination.

During the late 1960's, solid state electronic trip units were developed for use in high power, low voltage circuit breakers. These electronic trip units performed functions such as instantaneous and delayed tripping which were traditionally achieved by magnetic and thermal means. The improved accuracy and flexibility of the solid state electronic trip units resulted in their wide spread acceptance.

The earliest electronic trip unit designs utilized discreet components such as transistors, resistors and capacitors. More recently, designs such as disclosed in U.S. Pat. No. 4,428,022 have included microprocessors which provide improved performance and flexibility. Due to the severe space limitations in low voltage circuit breakers, the assignee of this application has developed a special purpose integrated circuit known as a SuRE Chip™, which incorporates a microcontroller core processor, volatile and non-volatile memory, and an eight bit analog-to-digital converter, four bit pre-ranging circuit amplifiers, comparators, and an input analog multiplexer which provides all of the essential analog and digital circuit functions in a single monolithic device. This device is described in detail in U.S. Pat. No. 5,525,985, issued Jun. 11, 1996.

These digital systems sample the current waveforms periodically to generate a digital representation of the current. The microprocessor uses the samples to execute algorithms which implement the protection curve which is typically based upon a constant value of $I^2t$ where "I" is the value of current and "t" is the time-to-trip. Typically in air circuit breakers and vacuum interrupters, the protection curve provides an instantaneous trip, a long delay trip and, if appropriate, a short delay trip function. In some circuit interrupters, the microprocessor also performs calculations for metering such as determining the RMS value of the highest phase current.

It is also common today to have a plurality of such circuit interrupters monitored and controlled by a central network control station such as is described in U.S. Pat. No. 5,420,799, issued May 30, 1995. In turn, the circuit interrupters usually have mechanical status indicating accessory devices mounted within the casings which are used by external and remote monitoring and control equipment. Examples of these are auxiliary contacts which follow the open/close status of the circuit breaker and bell alarm contacts which are closed if the breaker is in the tripped condition. While the central monitoring and control network typically communicates digitally with multiple circuit interrupters over a common network, the connection between the internally mounted mechanical contacts within the individual circuit interrupters and the remote slave devices is accomplished in parallel using two wires per pair of contacts. Usually multiple sets of auxiliary contacts are required and thus multiple pairs of wires are needed. The installation of this wire is costly and time consuming. In addition to digital status information, it is also desirable to provide certain analog information such as the value of load current, bus voltage, power factor, etc. Many remote utilization devices, such as programmable logic controllers, require this information as 4-to-20 ma current values. Typically, circuit breaker trip units don't provide 4-to-20 ma outputs.

The increase in related functional versatility that the electronic trip units of circuit breakers have added employing the capabilities of microprocessors has required the processing circuitry to monitor wide ranges in current and related parameters which can vary from open or a zero state, to a normal operating range where most of the metering calculations are performed, to the other extreme or short circuit states which exceed the normal operating range by a factor 10 or greater. Scaling of the monitored value is required to enable the microprocessor to monitor the entire range below its saturation limitations. The extent of scaling required to accommodate the trip values can affect the accuracy of the calculations performed in the metering range, the normal operating state of the protected device. It can also affect the microprocessor's ability to monitor harmonics and small distortions in the current.

Accordingly, an improved circuit interrupter is desired that has more flexibility in communicating with its auxiliary slave devices and has increased sensitivity to the monitored current over its normal operating range.

SUMMARY OF THE INVENTION

An electronic trip unit incorporating this invention communicates with a plurality of unique, remote, accessory devices over a two wire communication bus. The plurality of unique, remote, accessory devices respectively receive information from the electronic trip unit, representative of at least one characteristic or state of the load, and are individually responsive to selective portions of the communication to perform a given function. In the preferred embodiment, the communication bus is an asynchronous, serial, communication network with each accessory device of a given type having a unique address that is defined by its function. This remote accessory bus permits two way communication when requested by the electronic trip unit, which functions as the master. The accessory devices are desirably addressed by their function.

In another embodiment, the electronic trip unit employs a second digital communication network to communicate with a master controller. Communication with the master controller is managed by a first microprocessor within the electronic trip unit while communication with the accessory network is governed by a second microprocessor within the electronic trip unit. The two microprocessors exchange information as needed while one of the two has responsibility for monitoring the load current within its normal range of operation and performing the metering functions associated with that range and the delayed trip function, while the other microprocessor has responsibility for monitoring the ranges of load current associated with instantaneous trip conditions and processing the corresponding algorithms. In a further embodiment the instantaneous trip microprocessor communicates with the accessory network and the delay trip microprocessor communicates with a central network. Communication through the central control network and the auxiliary network are asynchronous though they each can employ their own distinct protocols.

BRIEF DESCRIPTION OF THE DRAWINGS

A full understanding of the invention can be gained from the following description of the preferred embodiments when read in conjunction with the accompanying awings in which.

DESCRIPTION OF THE PREFERRED EMBODIMENT

Figure 1:
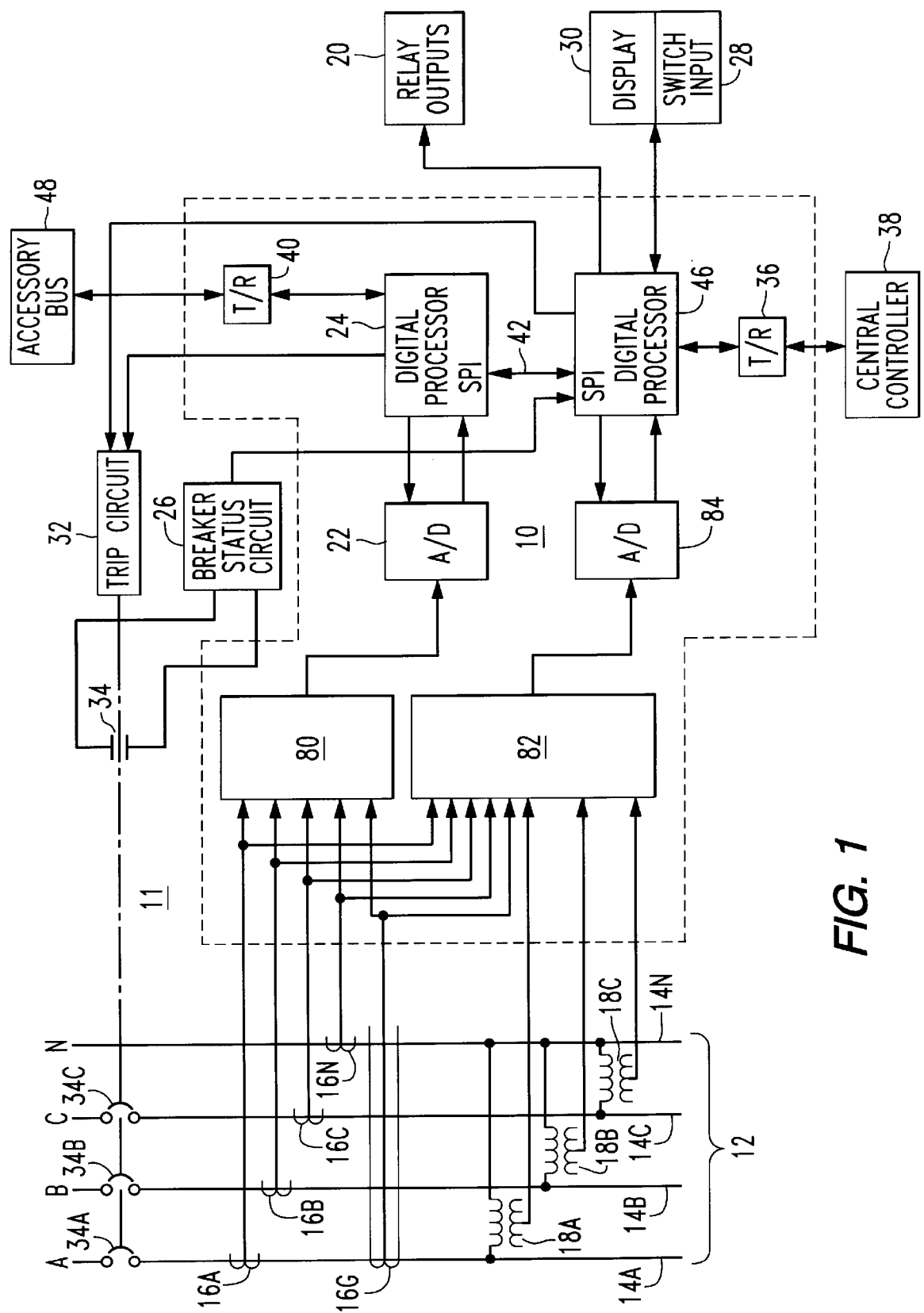
FIG. 1 is a schematic diagram, primarily in block form, illustrating a circuit interrupter configured in accordance with this invention.

FIG. 1 illustrates an electronic trip unit 10 of the invention in combination with ancillary components used for protection and capture of waveforms in an AC electrical power distribution system 12, which represents the load. Power Distribution System 12 may be alternatively identified as: a power distribution system, an electrical system, an Ac electric power system or a power circuit. The power distribution system 12 illustrated has three phase conductors 14A, B and C, and a neutral conductor 14N. Current transformers 16A, B, C, and N sense current flowing into each of these conductors. Current transformer 16G is a zero sequence transformer which indirectly measures ground current by directly measuring the sum of the phase and neutral currents. These currents are sensed by the conditioning circuits 80 and 82 which prepare the signals for processing by the analog-to-digital (A/D) converters 22 and 84, respectively. Phase-to-neutral voltages are also sensed from the three phase conductors 14A, B and C by the potential transformers 18A, B and C and are inputted to conditioning circuit 82 for processing by the A/D converter 84. The conditioning circuits 80 and 82 scale the current and voltage signals to a suitable range for conversion by the A/D converters 22 and 84 for input to microprocessors 24 and 46, respectively. For example, the microprocessors can be microcomputers.

The A/D converter 84 samples analog voltages and currents at sampling instances determined by interrupts generated by the microprocessor 46 in a manner more particularly described in U.S. Pat. No. 5,600,527, issued Feb. 4, 1997, and the patents referenced therein. The microprocessor 46 utilizes the data generated by the digital samples to provide voltage based protection functions for example, under/over voltage protection for the electrical system 12, and also uses the samples for waveform capture and harmonic analysis for metering and display purposes.

Figure 6:
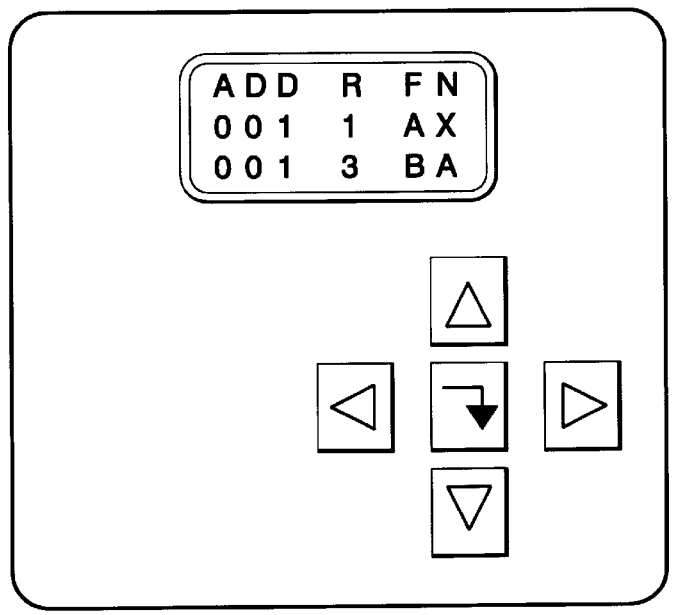
FIG. 6 is a perspective view of a display and switch input panel which can be used with this invention.

The microprocessor 46 communicates with a display and switch input panel 28 more fully illustrated in FIG. 6. The panel 28 serves as one means of interface with the user. It is through the panel 28 that the user can control the operation of the circuit breaker 11, and monitor the AC electrical power system 12, including the harmonic content of the waveform and various measured values such as power factor. To this end, the panel 28 has a display 30 on which the harmonic content of the waveforms can be presented to the user. The panel 28 can also be used to input values, e.g., the circuit breaker protection set points.

In implementing the overcurrent protection functions, the second microprocessor 24 operates in a protection mode to generate a trip signal when any one of the current/time characteristics of a delayed trip protection function is exceeded. This trip signal is passed to a trip mechanism 32 which opens separable contacts 34A, B and C in the three phase conductors 14A, B and C of the electrical system 12. The trip unit 32 is typically a mechanically latched electronically released mechanism. Although typically not provided in the United States, additional separate contacts can be included to also interrupt current in the neutral conductor 14N.

The microprocessors 24 and 46 can also communicate with one another through a serial peripheral interface (SPI) link 42. This allows, for example, communication between microprocessor 24 and panel 28. The microprocessor 46 can also communicate with a remote processor using the communication link 36 which is an analog transmit and receive circuit known as a transceiver. The transceiver 36 enables the circuit breaker or circuit interrupter 11 to provide information to and be controlled by a remote processor such as a central control network station 38. A central control network that can be employed for this purpose is described in U.S. Pat. No. 5,420,799, issued May 30, 1995. Central control networks of that type typically communicate over a common bus using a digital, asynchronous communication protocol.

Figure 5:
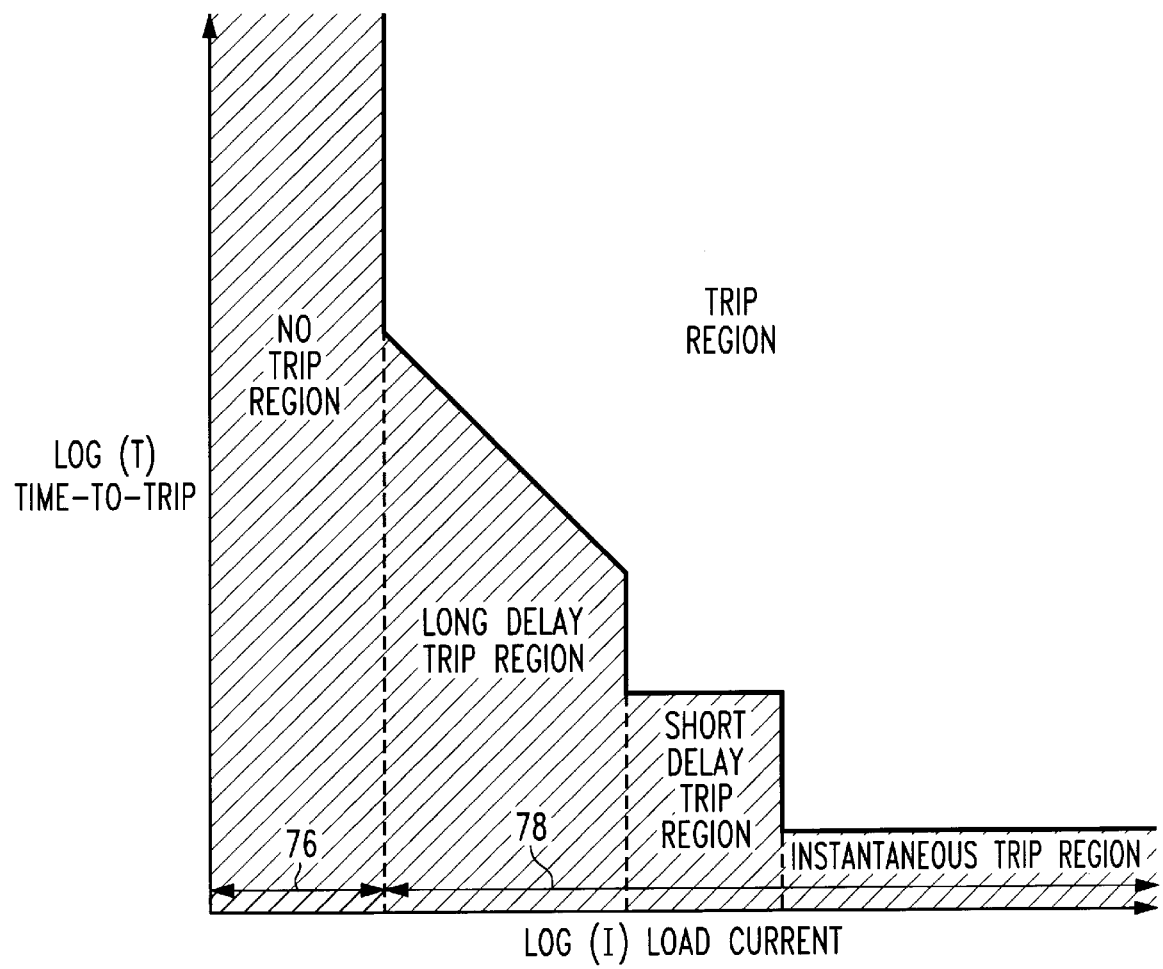
FIG. 5 is a graphical illustration of the load current-versus-time-to-trip curve over a range of load currents from a no trip value to an instantaneous trip value.

FIG. 5 illustrates a plot of the load current value versus time-to-trip from a no trip region to a device that experiences a short period of extremely high load current before entering an instantaneous trip condition. Reference character 76 illustrates the normal operating range. Reference character 78 identifies the broad current range that can be experienced under different trip conditions spanning from long delay to instantaneous. In some cases the current at the point of trip can be a factor of 10 of the normal operating current value. The broad current range makes it very difficult for a single microprocessor such as the microcomputers 24 and 46 shown in FIG. 1 to perform all circuit trip and metering functions accurately. The scaling factor that the conditioning circuits 80 and 82 would have to apply to maintain all of the signals that the microprocessor would be exposed to below its saturation state makes it very difficult for the processor to detect subtle changes, e.g., harmonic, in the normal operating range. FIG. 1 illustrates a further improvement provided by this invention in splitting the processing functions between two processors 24 and 46. In this way the monitoring, voltage based protection and metering functions and algorithms that need to be processed over the normal operating range of the power circuit 12 can be managed by the processor 46 while the overcurrent trip related functions can be handled by the microprocessor 24. Both processors can then communicate with trip circuit 32. In this way the conditioning circuit 82 need not scale the monitored currents to the coarse range that otherwise would have been required and the microprocessor 46 has more information available to it from the signal to perform its given functions. The conditioning circuits 80 and 82 permit different ranging factors for their respective microprocessors 24 and 46, and enable the respective microprocessors to implement different sampling rates which is sometime beneficial as noted in U.S. Pat. No. 5,600,527.

Thus the microprocessor 24 provides the overcurrent protection and communicates with the trip circuit 32 to implement an overcurrent instantaneous trip requirement. The microprocessor 46 also monitors auxiliary contacts 34 on the circuit breaker 11 through a breaker status circuit 26 to indicate the breaker's open/closed condition. The microprocessor 46 also communicates with relay outputs 20 that provide local breaker status information such as high load, ground fault, etc. to a remote location. The microprocessor 24 communicates through a second transceiver 40 to an accessory bus network 48 which will be described hereafter.

Present day circuit breakers typically have internal contacts or relays which can be wired to a remote location to provide a remote indication of the digital status of the circuit breaker. The status can include an indication of whether the breaker is in an opened, closed, or tripped condition. A pair of wires from the breaker is required for each remote status indication. Remote open or close control of a circuit breaker can also be provided utilizing a pair of wires for each function from a remote location to the circuit breaker. An open command can consist of a voltage on a pair of wires connected to the breakers shunt trip circuit. A close command can consist of a voltage on a pair of wires connected to the breakers motor operator. A pair of wires is required for each remote digital input/output function. The installation of these wires is both costly and time consuming.

In addition to digital status information, it is also desirable to provide certain analog information such as the value of load current, bus voltage, power factor, etc. Furthermore, most remote utilization equipment such as programmable logic controllers require the information as 4-to-20 ma current signals. Circuit breaker trip units don't typically provide 4-to-20 ma analog outputs.

Figure 2:
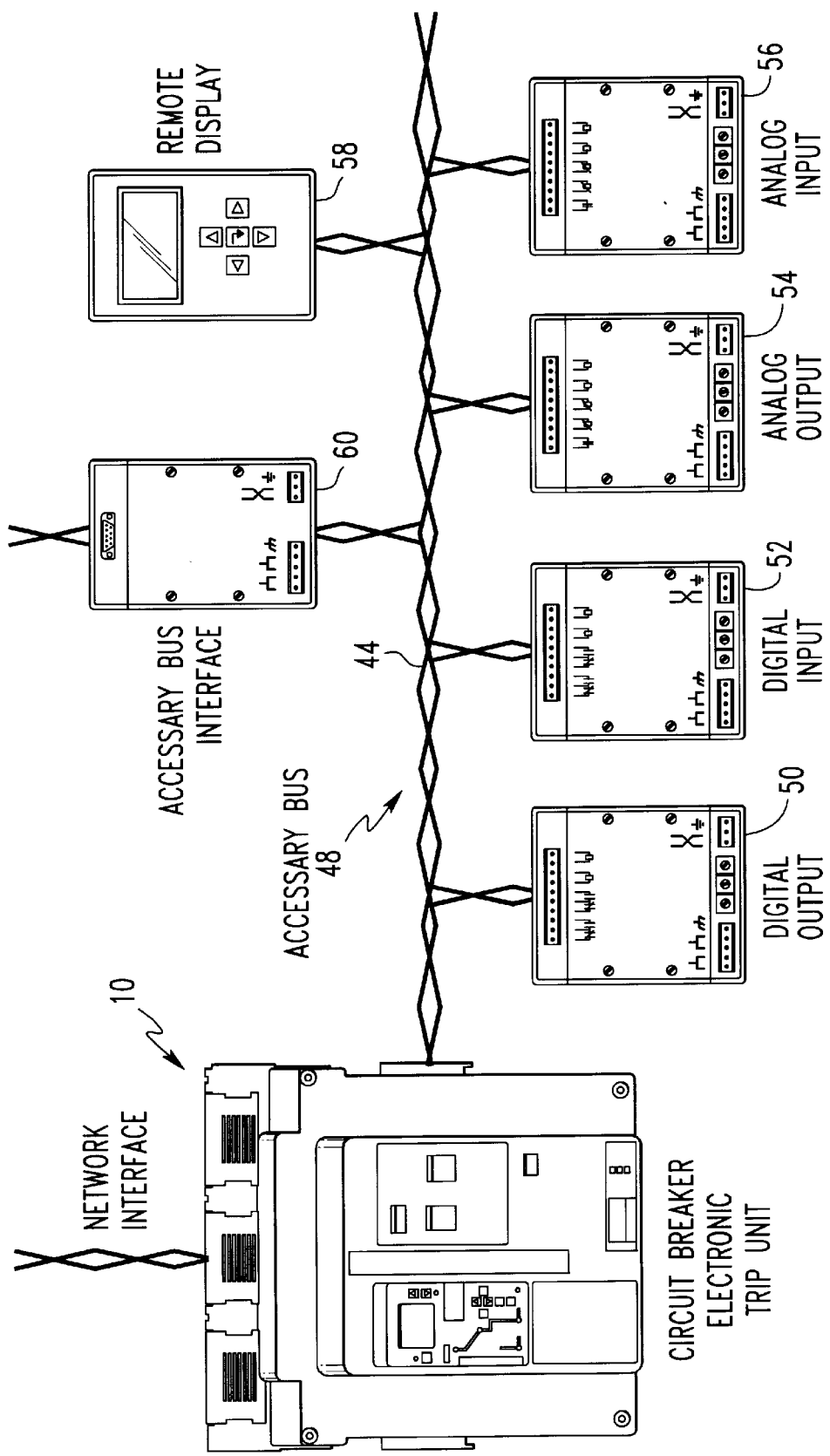
FIG. 2 is a schematic diagram showing the accessory bus network of this invention.

This invention replaces parallel pairs of separate wires to the various remote accessory devices associated with a given electronic trip unit 10 with a two wire, asynchronous, serial communication network 48 that is illustrated in FIG. 2. The network 48, called an accessory bus, is dedicated to a given protective device such as the electronic trip unit 10. The electronic trip unit 10 will serve as the bus "master" that controls remote "slave" devices which are the various analog and digital input and output accessory units 50, 52, 54, 56, 58 and 60. The information to and from remote accessory units to the master trip unit 10 is carried over a single, rather than multiple, pair of wires 44. FIG. 2 shows six representative types of accessory devices, each representative of the type of communication it provides or requires. For example, device 50 is representative of an accessory which provides a digital output; device 52 is representative of an accessory that accepts a digital input; device 54 is representative of an accessory that provides an analog output; device 56 is representative of an accessory that accepts an analog input; remote device 58 is representative of an accessory providing a remote display; and interface 60 is an accessory bus interface for devices such as a personal computer or a communications MODEM. It should be appreciated that one or more of these functions may be required by a single remote device such as a programmable logic controller. One special digital input and output device is a programmable time-delayed close relay which can be used to start a generator following a power outage. The delay would be sent from the electronic trip unit 10 to the relay over the network 48 during normal operation. Should the power fail, the timer within the relay, powered by a "super cap", would start timing. After time out, the timing circuit discharges a capacitor into a magnetically latched relay which transfers the relay to a closed condition. The relay is wired into the generator start circuit which allows the generator to be started to restore power. When power is restored the latched relay is restored to the open condition. The network 48 can also be provided with an interface 60 that can alternately serve as the interface with a personal computer for purposes of inputting, monitoring and storing breaker trip unit setpoints. The interface can also be used to communicate with other networks via a MODEM. Such a MODEM could be a phone connection which initiates a call should a problem exist.

The address of each slave device can be set by its function, for example, as in Table 1 where "DO" represents digital output devices; "DI" represents digital input devices; where "AO" represents analog output devices; where "AI" represents analog input devices; where "DD" represents digital display devices; and "I" represents an interface to another system.

TABLE 1

| Type | Address | Hardware | Function |
|------|---------|----------|----------|
| DO | 001H | 1 or more relay outputs | auxiliary contacts which follow state of circuit breaker |
| DO | 002H | 1 or more relay outputs | bell arm contacts which indicate a trip condition |
| DO | 003H | 1 or more relay outputs | high load alarm contacts |
| DO | 004H | 1 or more relay outputs | ground fault alarm contacts |
| DO | 005H | 1 latched relay | time-delayed generator start |
| DI | 007H | 2 push button inputs | remote open/close control input |
| AO | 008H | 4 to 20 mA output | RMS value of highest phase current scaled 4 mA = 0A and 20 mA = rated current |
| AI | 009H | 3 RTD inputs | circuit breaker terminal or switchgear bus temperature |
| DD | 00AH | remote digital display | provides remote means for reading breaker setting, metered values, etc. |
| I | 00BH | RS232/RS485 | PC or MODEM interface to electronic trip unit |

* H indicates a hexadecimal address

Setting the address of each slave device by its function eliminates the need for the electronic trip unit to be programmed for a given application. Alternately the display and switch input 28 can be used to provide such programming. This allows a single slave device such as a digital output unit 50 to be programmed for multiple purposes. Each slave device would need to have means such as switches to allow its address to be set. Also the display and switch input 28 can be used as shown in FIG. 6 to program the bus. The display is shown as having three rows with eight alpha/numeric characters per row. The first row is used for column labels such as slave address (ADD), slave relay number (R) and relay function (FN). A digital output slave 50 is identified in row 2 (address 001H). Its relay 1 (it could have for example 4 relays) is programmed to function as an auxiliary contact (AX). Row 3 illustrates that the same slave device 50 has its relay 3 programmed to function as a bell alarm (BA). Thus the display and switch input device 28 shown in FIG. 6 can be used to set the desired address, I/O number, and I/O function. Once programmed the trip unit will verify that the slave device at a given address is the type specified. If not, the display would blink to annunciate a programming error.

Figure 3A:
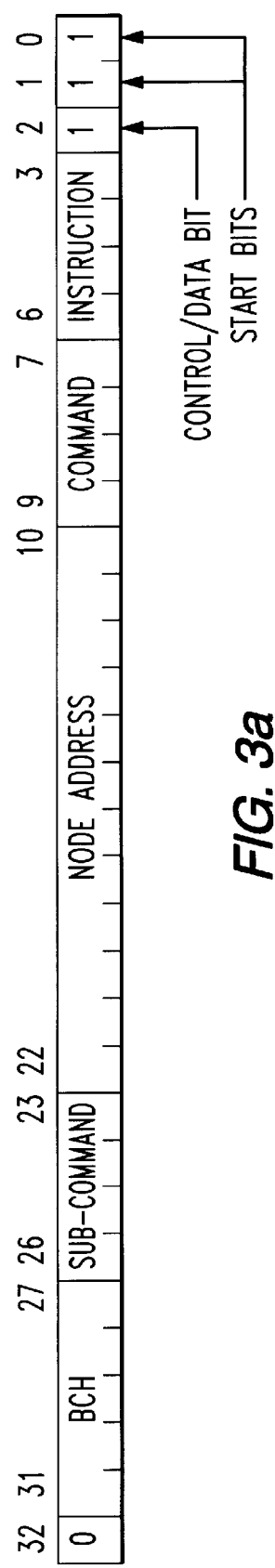
FIG. 3A is a representation of a control message employed by this invention.
Figure 3B:
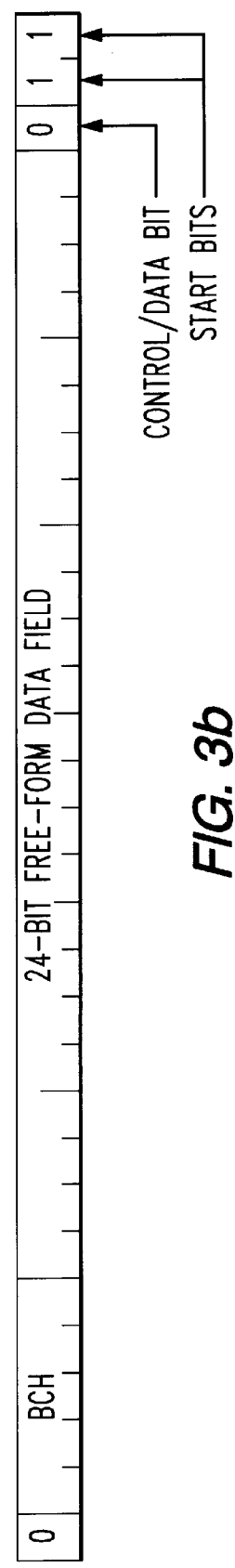
FIG. 3B is a representation of a data message employed by this invention.

The microprocessor 24 within the electronic trip unit 10 communicates with accessory bus devices using control messages illustrated in FIG. 3A and data messages illustrated in FIG. 3B. The communication consists of 33 bit asynchronous messages. The first two bits, bit 0 and bit 1, are start bits which are used to synchronize the receiver. The third bit, bit 2, is a control or data bit. As shown in FIG. 3A, this bit is 1 if the message is a control message. If it is, then bit 10 through bit 22 contains the 12-bit slave destination address.

Bit 3 through bit 6 consist of an instruction field which is used to set the communications hardware. In this accessory bus application, this field will be $0011_B$ (binary), or $3_H$, which enables the addressed slave device to communicate back to the master microprocessor 24. All other slave devices which are not addressed have their communication interface disabled by the message. This establishes a master-slave communications network as a slave can speak only when enabled.

The command and subcommand fields, bit 7 through bit 9 and bit 23 through bit 26 are used to pass a command request to the slave. As an example, should the slave be a digital output device consisting of four relays the command field could consist of the desired state of the relays while the sub-command could be the complement of the desired state. Thus if a 0 means that a relay should be de-energized and a 1 energized, then a command of $0010_B$ would means that relays 4, 3 and 1 should be de-energized while relay 2 is energized. The slave will not respond to this request unless the sub-command field contains the complement of the command field or $1101_B$. The command and subcommand field's definitions are thus specific to the slave device function.

The data message shown in FIG. 3B is typically used to send data to/from a slave device. Bit 3 through bit 26 form a 24-bit data field. Should the slave be an analog input/output device consisting of two 4-to-20 mA inputs and two 4-to-20 mA outputs the communication message protocol master-to-slave could be as follows. First the master microprocessor 24 would send an instruction of $3_H$ to the slave and a command and subcommand which would instruct the slave to send the value of its two analog inputs and be prepared to accept the desired value of two analog outputs. The 24 bit data field would be considered to consist of two 12 bit fields where bit 3 through bit 14 represent analog value 1 and bit 15 through bit 26 represent analog value 2. The scaling would be such that the maximum value could be 20MA= $FFF_H$ or $4095_D$, while the minimum value would be 4MA= $333^H$ or $819_D$. A value less than $333_H$ such as zero indicates that the analog value is invalid or not used.

The Analog Input Module 54 shown in FIG. 2 can be used, for example, to measure bus bar temperature with the switchgear near the breaker terminal connection. Such a temperature measurement could be made by means of a resistance temperature detector (RTD). The voltage output of the RTD would be an input to Analog Input Module 54. The Circuit Breaker Electronic Trip Unit 10 can then read this value, display it on the Display and Switch Input 28, and trip the breaker if the temperature reading is too high. A high reading can occur if the breaker's contacts are worn or damaged. A poor contact can have a high resistance which will make the breaker's terminal run too hot, even if the current is below the full load rated value.

The Digital Input module 52 shown in FIG. 2 can be used to provide a remote open/close control station. For safety it is desirable to be able to close a breaker without standing directly in front of the unit. Two normally opened switches feeding a Digital Input module 52 can be used for this purpose. One normally opened switch would be labeled OPEN while the other would be labeled CLOSE. The Circuit Breaker Electronic Trip Unit 10 could read these two switches such that if one and only one switch is closed the breaker would perform the requested action. If both are opened or closed no action would be taken. Such a request would be confirmed by multiple reads to avoid false action.

The Remote Display 58 shown in FIG. 2 could be used to display Circuit Breaker Electronic Trip Unit 10 analog and digital information such as is normally displayed at the trip unit on the Display and Switch Panel 28.

The Accessory Bus Interface 60 shown in FIG. 2 has a number of uses. When connected to a personal computer (PC) it can be used as a means for programming the trip unit 10. The PC would have the ability to establish the desired setpoints by means of its display and then on command download the settings from the PC to the Accessory Bus Interface 60. The values would be saved in a non-volatile memory such that the values are preserved during a power outage. The Circuit Breaker Electronic Trip Unit 10 would be able to upload these values on command from the PC. Should a trip unit setting be changed using the Display and Switch Panel 28 the new values would be saved within the trip unit 10 and also downloaded to the Accessory Bus Interface 60. In this way the Accessory Bus Interface 60 will always hold the latest setpoint values. Should the trip unit 10 be changed it will be possible to upload the old values into the trip unit from the Accessory Bus Interface 60. The Accessory Bus Interface 60 can also be used as a communications MODEM connection such as a phone connection. This would allow the trip unit 10 to initiate a phone call should a circuit problem be detected.

Figure 4:
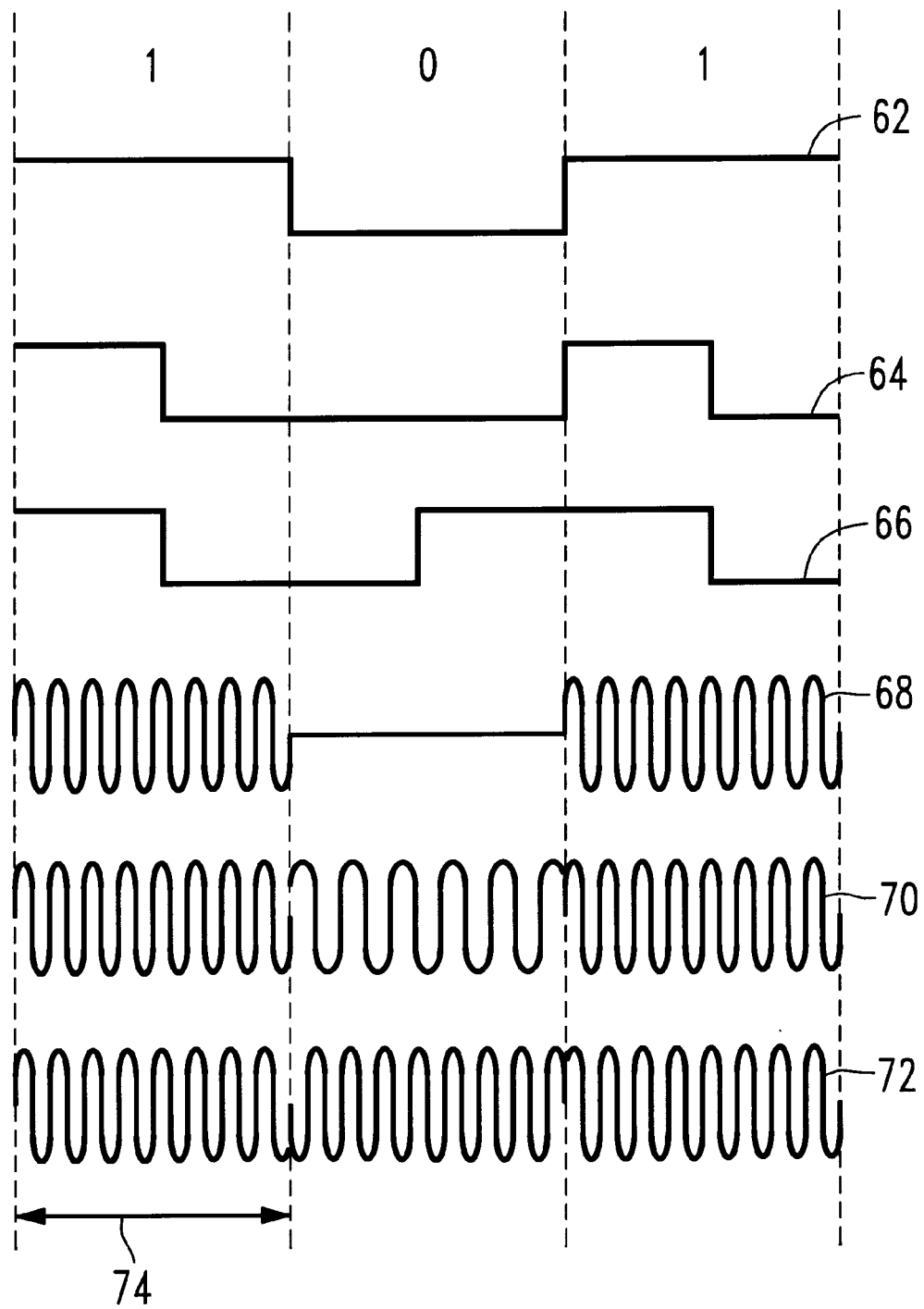
FIG. 4 is a graphical representation of examples of modulation that can be employed to establish each bit message represented in FIGS. 3A and B.

FIG. 4 illustrates a number of modulation examples that can be used to carry information on the asynchronous, serial communication accessory network. Waveform 62 is known as "non return to 0" modulation format "NRZ"; waveform 64 is known as "return to 0" modulation format "RTZ"; waveform 66 is known as "return to complement" modulation format "RTC"; waveform 68 is known as "amplitude shift keying" modulation format "ASK"; waveform 70 is known as "frequency shift keying" modulation format "FSK"; waveform 72 is known as "phase shift keying" modulation format "PSK." A BIT length is illustrated in FIG. 4 by reference character 74.

It should be appreciated that the foregoing protocols are exemplary and others may be employed without detracting from the invention. In addition the accessory bus 48 and the central controller 38 can employ completely different and distinct protocols.

Thus, in accordance with the preferred embodiment described heretofore, the microprocessor 24 performs the overcurrent protection, monitors the breaker status, trips the breaker during overload and fault conditions, and communicates with the microprocessor 46 through a serial peripheral interface (SPI) link 42 and serves as the master for the accessory bus 48. The microprocessor 46 provides metering and voltage based protective relay protection controls output relays, human interfacing by way of display and switch input panel 28, trip implementation under voltage based fault conditions or upon a request from the central controller 38, communication with the microprocessor 24 through the serial peripheral interface (SPI) link 42, and remote communication with the central controller 38 which serves as a master to the circuit interrupter 11. Either microprocessor 24 or 46 can trip the breaker should the information shared over the synchronous serial port 42 indicate that either or both microprocessors detect a problem. Thus, this invention provides a number of improvements enabling a layering of networks and improved communication and digital processing capability.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. An electronic trip unit which is operative under predetermined conditions to initiate a signal to open a load current circuit and interrupter current to the load including:
   an electrical output port on the electronic trip unit for conveying a signal representative of at least one characteristic of the load current circuit;
   a two wire communication bus in communication with the output port;
   a plurality of unique, remote, slave devices that respectively receive information from the output port over the communication bus and are individually responsive thereto to perform a given function; and
   a first and second microprocessor wherein the first microprocessor performs voltage based protection and metering functions of the trip unit and the second microprocessor controls communication through the output port to the slave devices and performs overcurrent and instantaneous protection functions of the trip unit.

2. The electronic trip unit of claim 1 wherein the first microprocessor communicates with a network controller.

3. The electronic trip unit of claim 2 wherein the network controller communicates with the first microprocessor through an asynchronous communication link.

4. A method of communicating between an electronic trip unit and a plurality of accessory devices comprising the steps of:
   connecting the electronic trip unit and the accessory devices to a two wire common network;
   communicating between the electronic trip unit and the accessory devices ver the common network where each of the accessory devices assigned a different function is addressed uniquely;
   communicating across the network using an asynchronous communication protocol; and
   controlling the electronic trip unit using a central controller that communicates with the electronic trip unit over a separate distinct network using an asynchronous communication protocol that is distinct from the protocol used to communicate with the accessory devices.

5. The method of claim 4 including the steps of:
   managing communication with the central controller, within the electronic trip unit, using a first microprocessor; and
   controlling communication with the accessory devices through the common network using a second microprocessor within the electronic trip unit.

6. The method of claim 5 including the steps of:
   performing metering and voltage based protection functions of the electronic trip unit with said first microprocessor; and
   performing an instantaneous trip function of the electronic trip unit with said second microprocessor.

7. The method of claim 6 wherein the first and second microprocessors monitor current in a load including the step of scaling the current to each microprocessor to a different value corresponding to a range of values monitored by said first and second microprocessors, respectively, which is established by the protection functions performed respectively by each said first and second microprocessors.

8. The method of claim 6 including the step of performing an overcurrent trip function of the electronic trip unit with said second microprocessor.

* * * * *